(12) United States Patent
Haspekian et al.

(10) Patent No.: US 9,591,142 B2
(45) Date of Patent: Mar. 7, 2017

(54) METHOD OF RESOLVING A PORTED TELEPHONE NUMBER INTO A NETWORK RESOURCE IDENTIFIER

(71) Applicant: ORANGE, Paris (FR)

(72) Inventors: Goar Haspekian, Paris (FR); Philippe Fouquart, Caen (FR); Olivier Cleuziou, Ivry sur Seine (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/442,337

(22) PCT Filed: Nov. 12, 2013

(86) PCT No.: PCT/FR2013/052703
§ 371 (c)(1),
(2) Date: May 12, 2015

(87) PCT Pub. No.: WO2014/072665
PCT Pub. Date: May 15, 2014

(65) Prior Publication Data
US 2016/0065747 A1    Mar. 3, 2016

(30) Foreign Application Priority Data

Nov. 12, 2012 (FR) ..................... 12 60742

(51) Int. Cl.
*H04L 12/66* (2006.01)
*H04M 7/12* (2006.01)
*H04L 29/12* (2006.01)

(52) U.S. Cl.
CPC .......... *H04M 7/128* (2013.01); *H04L 61/157* (2013.01); *H04L 61/1511* (2013.01); *H04L 61/605* (2013.01)

(58) Field of Classification Search
None
See application file for complete search history.

(56) References Cited

U.S. PATENT DOCUMENTS 6,882,838 B1 * 4/2005 Lee .................. H04M 3/42153
379/211.01
8,756,341 B1 * 6/2014 Richardson ......... H04L 67/2814
370/351
(Continued)

FOREIGN PATENT DOCUMENTS

EP    1278382 A1    1/2003

OTHER PUBLICATIONS

Haberler et al., RFC 5527: Combined User and Infrastructure ENUM in th ee164.arpa Tree, May 2009, p. 14.*
(Continued)

*Primary Examiner* — Otis L Thompson, Jr.
(74) *Attorney, Agent, or Firm* — David D. Brush; Westman Champlin & Koehler, P.A.

(57) ABSTRACT

A method of resolving by an original network/domain of a telephone number of a called party, belonging to a recipient network/domain. The method includes: a) a calling party, belonging to the original domain dispatches a message using the telephone number of the called party as routing identifier; b) a server of the original domain in charge of routing the message, or a DNS server, produces an interrogation key dependent on the telephone number and on a penultimate domain name; c) a DNS request is sent to a DNS server associated with the penultimate domain; d) the DNS server associated with the penultimate domain performs, by using the interrogation key, a search in a database ENUM associated therewith; e) the search provides at least one record containing a return network/domain including the recipient domain; and f) a DNS request is sent to the return domain.

9 Claims, 2 Drawing Sheets

```
9.8.7.6.5.4.3.2.1.3.3.e164.arpa.  NAPTR 10 100 "u"  "E2U+sip"   "!^.*$!sip:bernardo@b.com!"
9.8.7.6.5.4.3.2.1.3.3.e164.arpa.  NAPTR 10 101 "u"  "E2U+h323"  "!^.*$!h323:bernardo@example1.com!"
9.8.7.6.5.4.3.2.1.3.3.e164.arpa.  NAPTR 10 102 "u"  "E2U+msg"   "!^.*$!mailto:bernie@example2.com!"
```

(56) References Cited

U.S. PATENT DOCUMENTS

| | | | | |
|---|---|---|---|---|
| 2003/0156690 A1* | 8/2003 | Crockett | ................ | H04L 12/66 |
| | | | | 379/93.23 |
| 2015/0080128 A1* | 3/2015 | Terrell, IV | .............. | A63F 13/65 |
| | | | | 463/31 |
| 2015/0142986 A1* | 5/2015 | Reznik | .................... | H04L 67/16 |
| | | | | 709/228 |
| 2016/0099967 A1* | 4/2016 | Stemm | ................ | H04L 63/1483 |
| | | | | 726/1 |

OTHER PUBLICATIONS

Haberler et al., RFC 5527, Combined user and Infrastructure ENUM in th ee164.arpa Tree, Network Working Group, May 2009, pp. 6-8.*

International Search Report and Written Opinion dated Jan. 20, 2014 for corresponding International Application No. PCT/FR2013/052703, filed Nov. 12, 2013.

Niklas Beijar., IP Telephony Protocols, Architectures and Issues "TRIP, ENUM and Number Portability", Jan. 1, 2001 (Jan. 1, 2001), Proceedings (Report/Helinski University of Technology, Networking Laboratory, XX, XX, pp. 105-115, XP007906752, pp. 112-p. 114.

Brown Nortel Networks Gred Vaudreuil Lucent Technologies A"ENUM Service Specific Provisioning: Principles of Operation; Draft-ietf-enum-operation-01.txt", Oct. 27, 2000, vol. enum, No. 1, Oct. 27, 2000 (Oct. 27, 2000), XP015018187.

English translation of the Written Opinion dated May 12, 2015 for corresponding International Application No. PCT/FR2013/052703, filed Nov. 12, 2013.

* cited by examiner 9.8.7.6.5.4.3.2.1.3.3.e164.arpa.   NAPTR 10 100 "u" "E2U+sip"   "!^.*$!sip:bernardo@b.com!"
9.8.7.6.5.4.3.2.1.3.3.e164.arpa.   NAPTR 10 101 "u" "E2U+h323"  "!^.*$!h323:bernardo@example1.com!"
9.8.7.6.5.4.3.2.1.3.3.e164.arpa.   NAPTR 10 102 "u" "E2U+msg"   "!^.*$!mailto:bernie@example2.com!"

FIG. 1

3.3.e164.RootA0.   IN   DNAME   "3.3.e164.RootA.fr"

FIG. 3a 9.8.7.6.5.4.3.2.1.3.3.e164.RootA.fr.   IN   CNAME   "9.8.7.6.5.4.3.2.1.3.3.RootB.fr"

FIG. 3b 9.8.7.6.5.4.3.2.1.3.3.RootB.fr.   NAPTR   10   100   "u"   "E2U+sip"   "!^.*$!sip:bernardo@b.com!"

METHOD OF RESOLVING A PORTED TELEPHONE NUMBER INTO A NETWORK RESOURCE IDENTIFIER

CROSS-REFERENCE TO RELATED APPLICATIONS

This Application is a Section 371 National Stage Application of International Application No. PCT/FR2013/052703, filed Nov. 12, 2013, the content of which is incorporated herein by reference in its entirety, and published as WO 2014/072665 A1 on May 15, 2014, not in English.

FIELD OF THE DISCLOSURE

The present invention relates to telecommunications networks, and in particular to Internet protocol (IP) type networks.

More particularly, the present invention relates to identifying the network or the domain to which a user belongs on the basis of that user's public telephone number. A user is said to "belong" to a certain domain of the network of a given operator when the user possesses an account with that operator, and this applies regardless of the access network or the device(s) used by the user in order to connect to the network of the operator.

BACKGROUND OF THE DISCLOSURE

It should be recalled that on an international scale the format of public telephone numbers is defined by Recommendation E.164 of the ITU-T, where the ITU-T is a portion of the International Telecommunication Union (ITU) responsible for developing international standards.

It should also be recalled that IP networks can carry conversation services such as "voice over IP" (VoIP), "content sharing", or "instant messaging". Nowadays IP networks are generally suitable for performing advanced session control protocols such as H.323 or SIP.

The label H.323 covers a set of audiovisual communication protocols in an IP network, which protocols were developed by the ITU-T. They relate to signaling, negotiating data-coding parameters, and transporting data. They are widely used in VoIP and in video conferences, and also in several real time Internet applications such as "NetMeeting".

The session initiation protocol (SIP) was defined by the Internet engineering task force (IETF) in Document RFC 3261. That protocol makes it possible to set up, modify, and terminate multimedia sessions in a network using IP.

SIP is used in particular in infrastructures of the IP multimedia subsystem (IMS) type. IMS is defined by the third generation partnership project (3GPP) standards organization. That network architecture, which is applicable both to mobile and to fixed access networks, enables multimedia sessions to be set up dynamically and to be controlled between two clients and also enables resources to be reserved in the network for transporting multimedia streams. By means of this architecture, network operators can conveniently implement a management policy, provide a predetermined quality of service (QoS), and calculate how much to bill clients. At present, IMS makes it possible to access services of the telephone, video phone, presence, and instant messaging types, and it also manages interaction between them.

Communications services over IP networks can identify physical or virtual resources by means of character strings, e.g. an H.323 alias or a universal resource identifier (URI). The syntax of URIs is defined by IETF Document RFC 3986; knowing the URI of a resource makes it possible to obtain the IP address of a piece of equipment in the network of the operator managing that resource.

In particular, in networks that use SIP, a distinction is drawn between two types of resource identifier: those in the "SIP-URI" form as defined in RFC 3261, and those of the "tel-URI" form as defined in RFC 3966. An SIP-URI is of the form "sip:user@host" (e.g. sip:alice@domain1), where the "host" part identifies the domain of the operator responsible for the identity represented by the "user" part. A tel-URI is of the form "tel:telephone_number" (e.g. tel:+33123456789) which refers to international public telephone numbers, or of the form "tel:telephone_number:phone-context= . . . " (e.g. tel:0623456789;phone-context=+33) with reference to telephone numbers in a format that is valid only in a narrower context (in this example the 10-digit number format 0623456789 is valid only within the French numbering plan).

For reasons of brevity, throughout the remainder of the present description, the term "URI" is used for any type of physical or virtual application resource that is accessible on a network.

It should also be recalled that the domain name system (DNS) is a service that enables information to be found starting from a domain name. DNS servers make associations of a domain name with information of a certain type, known as resource records, available to any client computer ("DNS resolver") that has issued a DNS request. In particular, naming authority pointer resource records (NAPTR) as described in RFC 3402 specify substitution rules for application to a character string in order to produce a certain result, such as in particular another domain name or a URI. The DNS system, on the basis of NAPTRs, thus makes it possible to match one character string with another by searching for a domain name: by applying a rule specific to the application in question, it suffices to transform the original character string into a domain name that is to be associated with a substitution rule for application to the original string in order to produce the looked-for result.

In order to be able to set up a call via one or more networks, the network/domain to which the caller belongs and referred to below as the "originating" domain, must therefore know the identity of the network/domain, that makes it possible to reach the called user and that is referred to below as the "destination domain". However, the caller often knows only the telephone number of called user, which telephone number is in the public format specified in Recommendation E.164 or in a private format. Unfortunately, the telephone number does not make it easy to determine the identity of the destination domain; in other words, there is no automatic association between the E.164 identifier and the URI (or URIs) for entry into the destination domain. In this respect, it may be observed that a domain may possesses a plurality of entry URIs, which may also possibly be a function of the identity of the calling domain; for reasons of brevity, in the present document, the term "URI of the destination domain" is sometimes used to mean the entry URI(s) of that domain.

Furthermore, it is generally not possible to identify the destination domain from the structure of the telephone number (e.g. its initial digits), since it is not known a priori whether the telephone number in question has or has not been "ported". In this respect, it should be recalled that the term "number portability" refers to changing the operator or the domain that hosts the user associated with that telephone number.

In order to solve this problem, in a first known technique, the originating domain routes calls on the basis of telephone number ranges, in a manner analogous to the routing performed in the public-switched telephone network (PSTN) or in mobile switched networks such as the public land mobile network (PLMN). However such routing is expensive in terms of operational management (initial configuration, plus modifications if any). Furthermore, in particular with international calls, the originating domain has only partial knowledge about the way the numbering plan is managed in the destination country, which can make intermediaries necessary and can prevent a direct connection being established between the originating domain and the destination domain. This type of solution requires dedicated processing that cannot be shared with the processing used for routing alphanumeric URIs, i.e. URIs in which the "user" component (such as "alice" in sip:alice@domain1) is not a telephone number, said routing using the "host" component of the URI (i.e. "domain1" in sip:alice@domain1).

In a second known technique, the originating domain implements a telephone number mapping (also known as tElephony NUmbering Mapping) (ENUM) application. The ENUM application uses a database specific to the network to which the originating domain belongs and containing particular NAPTRs defined in RFC 3761. By means of a DNS request using an interrogation key (as described above) representative of a telephone number in E.164 format, the ENUM application makes it possible to discover the URIs that can be used for reaching a called party. These URIs point to resources or services associated with the E.164 number of the called party, such as for example an email address, a web page, a directory service, fixed or mobile transfer numbers, or a VoIP, video phone or instant messaging alias for SIP or H.323 protocols.

In practice, two situations can arise when interrogating an ENUM database.

In the first situation, the interrogation key is indeed present in the ENUM database and the corresponding NAPTR gives the value "u" to a parameter called "Flags" (as specified in RFC 3761). This value "u" indicates that the ENUM request is "terminal" in the sense that the response to the request gives directly one or more URIs for the called party (when there are several URIs, the response also gives a recommendation as to the order in which they should be processed).

In the second situation, the interrogation key does not appear in the ENUM database. Under such circumstances, routing cannot be performed using the above-described mechanism, but, inconveniently, requires the operator of the network to set up an ad hoc mechanism that is dedicated to known telephone numbers. This ad hoc mechanism varies from one operator to another and can make methods of analyzing numbers in call servers more complex, or it can define a route by default, e.g. requiring transit via the public-switched telephone network PSTN.

It is necessary to have recourse to such an ad hoc mechanism in particular when the telephone number has been ported, as mentioned above. Ad hoc functions must then be developed to incorporate in standard routing mechanisms the ability to detect that the number has been ported from one network or domain to another. Without that, a call to a number that has previously been ported from one network or domain to another network or domain would fail.

This problem of portability relates to any type of telephone call, i.e. any operation seeking to set up a network session (VoIP, video conference, instant messaging, etc.) that makes use of this "called" telephone number. More generally, the problem relates to any message of a session control protocol (e.g. SIP or H.323) using a telephone number as a routing identifier, regardless of the purpose of the message, e.g. setting up a telephone call, opening a session, subscribing to the state of a resource (a SIP SUBSCRIBE message), or requesting the capacity of a resource (SIP OPTIONS message). The "user" associated with a telephone number acting as a routing identifier may be a human being or a machine (e.g. a telephone answering machine), or it could equally well be a service, which service was initially hosted on a first operator domain and has since been ported to a second operator domain.

One solution to this problem could consist in recording in each ENUM database all of the portability data (e.g. the current network/domain to which the user associated with the telephone number now belongs), or at least those relating to numbers leaving the network under consideration; however such a solution would have considerable impact on the processes of managing portability data (inputting, updating, verifying consistency, etc.), in particular because of the fact that DNS infrastructures managed by distinct operators are de facto separate and compartmentalized: that solution is therefore very difficult to put into practice.

A second solution consists in extending existing ENUM servers so as to incorporate an interface for interrogating the database of number portability history. However such a solution is contrary to DNS logic; in addition, it assumes that there are as many extensions as there are distinct ENUM servers that have been deployed, which would make the network operator highly dependent on its ENUM server suppliers.

The document entitled "IR.67-DNS/ENUM guidelines for service provides & GRW/IPX providers", published on Aug. 13, 2010 by the "GSM Association", proposes (cf. in particular Appendix C) considering each ported number as a zone of the naming space delegated to the taking operator. That makes it necessary for each ported number to store records of a particular type referred to as the name server (NS) type in the redirecting server and in the destination server, together with additional zone definition records of the start of authority (SOA) type in the destination server. A first drawback of such an "NS records" solution is that the operators concerned need to agree on a common ENUM root. A second drawback is that it triples the quantity of records stored by the taking operator; and since the industrial licenses of ENUM servers can be proportional to volume, such a solution would be extremely expensive.

SUMMARY

The present invention thus provides an ENUM database containing at least one CNAME or DNAME record providing a referral domain in response to an interrogation key that is a function of the telephone number of a "called" user. Said ENUM database is remarkable in that said called user belongs to said referral domain and in that said telephone number has been ported in relation to a change in the network/domain of the called user.

Thus, in the present invention, DNS requests are redirected by means of DNS records of particular types known as CNAME and DNAME (of definitions that are recalled below). These records, which in general terms are known, serve to substitute the domain name to which the DNS request applies with a new domain name referred to as the "referral domain", which then acts as a search key for a subsequent interrogation of an ENUM application.

It is then known to which domain, and with what interrogation key it is possible to redirect a DNS request in order to obtain information about the present URI associated with a telephone number that has previously been ported. The name of this referral domain has been input into said ENUM database during the procedure for porting the telephone number, i.e. at the time the user of that telephone number changed domains.

By means of these provisions, it is possible, via a standard DNS interface and without deforming the logic of the DNS service or the hierarchical organization of data that it implies, to recover the looked-for association between a ported telephone number and the entry URI of the domain (e.g. the destination domain for a VoIP call) to which the user of the ported telephone number presently belongs.

Advantageously, the invention does not require any naming convention between operators. Furthermore, it is very simple to supply an ENUM database with the information needed for implementing the present invention and there is no need for data to be updated frequently, since the invention does not manipulate the portability data itself, which may naturally vary over time, but rather data configurations, which are essentially static.

Finally, in comparison with the NS records solution outlined briefly above, it should be observed that the present invention makes it possible to have separate DNS roots and to transfer simply from one tree to another. The invention therefore does not require management of a common root in a dedicated server; it does not require zones in the assigning operator to be delegated and it therefore does not require multiple zones to be created in the server of the taking operator. The present invention thus makes possible:

greater data compartmentalization, since, from a data consistency point of view, DNS servers between operators depend less on one another; and easier migration from existing DNS servers that are deployed in independent manner by each operator.

The ENUM database of the invention may advantageously be associated with a fixed or mobile circuit-switched telephone network. By way of example, it may be the "historical" database conventionally used by the PSTN.

According to particular characteristics, said ENUM database may be dedicated entirely to ported telephone numbers.

By means of these provisions, each time a number leaving an operator's network/domain is ported to some other network/domain, an operator can conveniently make a record of the name of that other network/domain in a dedicated ENUM database. In another advantageous application, the manager of the ENUM database inserts therein CNAME or DNAME records relating to a set of respective telephone numbers leaving various respective networks/domains and for which the manager knows the respective referral domains, in order to be capable of responding (possibly in return for payment) to requests for information about the portability of a particular telephone number.

In another aspect, the invention provides a DNS server associated with an ENUM database as described briefly above.

It should be observed that it is possible to implement these ENUM databases and this DNS server in the context of software instructions and/or in the context of electronic circuits.

In yet another aspect, the invention provides the use of an ENUM database as described briefly above.

More particularly, the invention provides a method enabling a network/domain, referred to as an "originating" domain to resolve a telephone number of a user referred to as a "called" user belonging to a network/domain referred to as a "destination domain", the method comprising the following steps:

a) a "calling" user belonging to said originating domain sending a message using said telephone number of the called user as a routing identifier;

b) a server of the originating domain in charge of routing said message, or a DNS server, generating an interrogation key as a function of the telephone number and of a domain name for a domain referred to as a "penultimate" domain;

c) sending a DNS request to a DNS server associated with said penultimate domain;

d) said DNS server associated with the penultimate domain using said interrogation key to search in an ENUM database that is associated therewith;

e) said search providing at least one CNAME or DNAME record containing a representation of a network/domain referred to as a "referral domain"; and f) sending a DNS request to said referral domain.

Said method is remarkable in that said referral domain comprises said destination domain, and in that prior to said message being sent, said telephone number has been ported in relation to a change of the network/domain of the called user.

In particular, said message may be a telephone call, and said server of the originating domain in charge of routing the message may be a call server.

It should be observed that since a URI may, where appropriate, identify a user of a non-IP network (e.g. a URI of the type "tel:" in accordance with RFC 3966 may be used to identify a user of a PSTN or a GSM network), the method of the invention applies to messages using as their routing identifier a telephone number that has been ported from an IP or a non-IP network to another IP or non-IP network.

It should also be observed that in the context of the present invention, the term "penultimate domain" is used to designate the domain associated with an ENUM database of the kind described briefly above, i.e. containing a record of the CNAME or DNAME type and referring to the destination domain; in other words, the term "penultimate domain" designates the domain associated with the last DNS server to be consulted before consulting a DNS server associated with the destination domain. In certain situations, the DNS server of the originating domain that is the first to be interrogated by said server of the originating domain in charge of routing the message will refer directly to the destination domain: the penultimate domain will then be identical to the originating domain. However in other situations (such as that illustrated below in an implementation), several referrals will be necessary, i.e. one or more additional DNS servers will be interrogated in succession before interrogating (in step c) above) the DNS server of the penultimate domain: the penultimate domain is then not necessarily identical to the originating domain; for example, said penultimate domain may be a third network distinct from the originating domain and from the destination domain, and under such circumstances the called telephone number may belong to a range of numbers that has been delegated to the operator of said third network for his own usage. In any event, providing the referrals are correct, then there exists in a certain referral domain (the destination domain) a database including a record associating a representation of said telephone number with a representation of a present resource identifier (URI) of the called user.

In known manner, the DNS resolver, i.e. the server of the network issuing a new DNS request, may in recursive manner be the DNS server that has just been interrogated, or in iterative manner it may be the server of the originating domain in charge of routing the message.

The advantages offered by these methods are essentially the same as those offered by the ENUM databases described briefly above.

The invention also provides a computer program downloadable from a communications network and/or stored on a computer readable medium and/or executable by a microprocessor. The computer is remarkable in that it includes instructions for executing steps of the method described briefly above for resolving a telephone number when the program is executed on a computer.

The advantages provided by this computer program are essentially the same as those provided by said method.

BRIEF DESCRIPTION OF THE DRAWINGS

Other aspects and advantages of the invention appear on reading the following detailed description of particular implementations given as non-limiting examples. The description refers to the accompanying drawings, in which.

DETAILED DESCRIPTION OF ILLUSTRATIVE EMBODIMENTS

As mentioned above, NAPTRs specify how to produce a URI from an original character string from which an interrogation key is derived having the form of a domain name, to which the DNS request relates. This original character string is known as an application unique string (AUS). In equivalent manner, it can also be said that NAPTRs represents "re-writing" rules for application to an AUS.

The parameters of NAPTRs are as follows:

1. "Order": indicates the order in which NAPTRs are to be evaluated; so long as there remain records for examination having the same "Order" value, the records of following "Order" values are not taken into consideration;

2. "Preference": specifies relative priority between a plurality of NAPTRs having the same "Order" value;

3. "Flags": indicates for example whether the record describes non-terminal re-writing (giving as its result a domain name pointing to another record) or terminal re-writing; the precise meaning of the "Flags" parameter depends on which dynamic delegation discovery systems (DDDS) application is used, where such a system is described in RFC 3401;

4. "Services": describes the re-writing service; the precise meaning of this parameter also depends on which DDDS application is used;

5. "Regexp": the re-writing operation itself, formalized as a regular expression; this regular expression is to be applied to the AUS; this parameter cannot be supplied at the same time as the "Replacement" parameter; and 6. "Replacement": the domain name that is to be the subject of a new DNS request, and making it possible for example to perform non-terminal re-writing by delegation; this parameter cannot be supplied at the same time as the "Regexp" parameter.

Specifically, the ENUM function constitutes a particular DDDS application in which the AUS is constituted by a telephone number. Specifically, in the context of the ENUM application, provision is made for:

the parameter "Flags" can only take the values "u" or " " (empty); and the value of "Services" specifies the type of the resulting URI (e.g. SIP-URI or tel-URI, or indeed an email address).

A few general points about the notion of a domain name are summarized below.

A domain name identifies a node in a network, in particular an IP network. Each node possesses a (possibly empty) resource information set. The resource information set associated with a given name is made up of resource records (RR). In particular, each RR contains:

the "proprietor" of the RR, i.e. the domain name in which the RR is to be found;

the "type" of the RR, which is an additional information field made up of binary character strings and of domain names, e.g.:

an IP address; or a canonical name (CNAME), as described in greater detail below; or a Delegation Name (also known as non-terminal DNS name redirection) (DNAME), also described in greater detail below; or a PTR, i.e. a pointer to other data in the DNS system; or indeed an NS server or an SOA zone, as mentioned above; and a "class", which specifies a particular protocol, e.g. the Internet (designated by IN).

In existing IP systems, hosts and other resources often use a plurality of names to identify the same resource. For example, the names orange.com and orange-ftgroup.arpa could both identify the same host. Likewise, with email addresses, many organizations provide a plurality of names that actually all go to the same email box.

Most such systems work on the basis that one of the equivalent names is the canonical or primary name, and all of the others are pseudonyms. The DNS system uses this principle, as explained in IETF Documents RFC 1034 and 1035 for CNAME, and in IETF Document RFC 6672 for DNAME. An RR of CNAME/DNAME type identifies the name of its proprietor as a pseudonym, and specifies the corresponding canonical name in a section of the RR called RDATA.

The CNAME and DNAME RRs share in common the fact that an interrogation of such an RR sends the corresponding data to a domain name that is different from the domain name constituting the subject of the interrogation. The difference between these two types of resource records is that an RR CNAME redirects DNS requests presented to the proprietor of the record to some other name (a unique name), whereas an RR DNAME redirects DNS requests presented to a descendant of the proprietor of the record to corresponding names under another (unique) node of the tree. In other words, an RR DNAME redirects an interrogation from a portion of the name tree of the DNS system to another portion of the name tree of the DNS system.

When a DNS server does not manage to find the desired RR in the resource set associated with the domain name, it verifies whether the resource set consists in a CNAME or DNAME record with a corresponding "class". If so, the DNS server includes that record in its response, and continues searching from the domain name given in the RDATA field of the CNAME/DNAME record.

For example, assume that a search is being made in a zone for a domain name "foo.example.com" and that a resource record of the DNAME type is found relating to "example.com", with this record indicating that all interrogations relating to "example.com" should be redirected to "example.net". The DNS request process then returns to its starting point, but with a new interrogation key "foo.example.net"; if the initial interrogation key was for example "www.foo.example.com", then the new interrogation key would be "www.foo.example.net".

DNS servers must be sufficiently well designed to respond correctly when they have presented thereto either a CNAME/DNAME chain, or else a loop: they are supposed to be capable of following a chain of CNAMEs and/or DNAMEs, while indicating loops of CNAMEs and/or DNAMEs as being errors.

By way of example, there follows a description of the conventional steps of a method of making a telephone call to a telephone number recorded in an ENUM database of a network containing an IP domain to which the caller belongs.

During a step E1, a subscriber—we call her "Alice"—belonging to an IP name referred to as the "originating domain" A uses any access network to place a telephone call to a subscriber—we call him "Bernardo"—identified by an E.164 number. By virtue of the session control protocols used in the IP networks, the routing of this call requires knowledge of the entry URI of the IP domain referred to as the "destination domain" B, to which Bernardo belongs.

During a step E2, the call issued by Alice is received by a call server of the operator A managing the originating domain A. By way of example, we assume that the originating domain A is a network of IMS type, or is included in such a network, and that therefore the called server is generally constituted by a serving-call session control function (S-CSCF) server; it should be recalled in this respect that IMS networks have one or more such S-CSCF servers that are suitable (amongst other things) for managing the procedure for registering users on the network.

During a step E3, this S-CSCF server, after determining that the called number complies with the E.164 standard, converts this number into an expression constituting a domain name, and that is suitable, when used as an interrogation key, for searching the URI attached to the called party Bernardo in an ENUM database of a DNS server of the originating domain A. Thereafter, the S-CSCF server sends a request containing this interrogation key to this DNS server.

For example, starting from Bernardo's E.164 number "+33123456789", the S-CSCF server inverts the order of the digits to construct the expression "98765432133", and then by inserting dots between each successive pair of digits it constructs the expression "9.8.7.6.5.4.3.2.1.3.3". Thereafter, this expression is concatenated with a predefined domain name—which we call "root"—to obtain the expression "9.8.7.6.5.4.3.2.1.3.3.root". RFC 3761 defines the value of "root" as being "e164.arpa." for DNS servers for public use; it is allowable for DNS servers for private use to define their own roots.

During a step E4, after receiving the request from the DNS server, the ENUM function searches in its database using the interrogation key "9.8.7.6.5.4.3.2.1.3.3.root".

Figure 1:
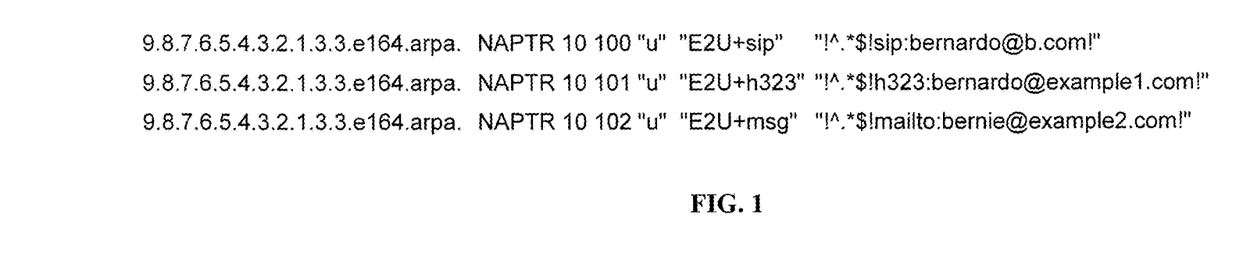
FIG. 1 shows examples of conventional NAPTRs.

When the "root" is "e164.arpa.", these records may for example be those shown in FIG. 1.

In each of these three records, the value "u" of the "Flags" parameter indicates that is known how to substitute a URI for the record key. Thus, for this telephone number "+33123456789":
- the first record serves to obtain the SIP-URI "sip: bernardo@b.com";
- the second record serves to obtain the URI "h323: bernardo@example1.com" associated with an H.323 network; and
- the third record serves to obtain the email address "mailto: bernie@example2.com".

During a step E5, these URIs are sent to a call server (in this example the S-CSCF server) of the originating domain A in response to the DNS request.

Finally, during a step E6, the request to set up a call is routed, preferably (given the values of the parameters "Order" and "Preference") to another SIP server associated with the domain "b.com". This SIP server, which constitutes the entry point to the network associated with the domain name "b.com" is generally an interrogating-call session control function (I-CSCF), if the network is an IMS network.

In the above-described process, it is assumed that the telephone number "+33123456789" appears in the ENUM database of the root server. In contrast, if the number were a ported number, it would in the state of the art be absent from the ENUM database, and consequently the called server would not receive any URI in response to its DNS request, unless, as explained above, special arrangements (that are particularly complex to implement) have been taken in this respect by the operator of the originating domain A.

Figure 2:
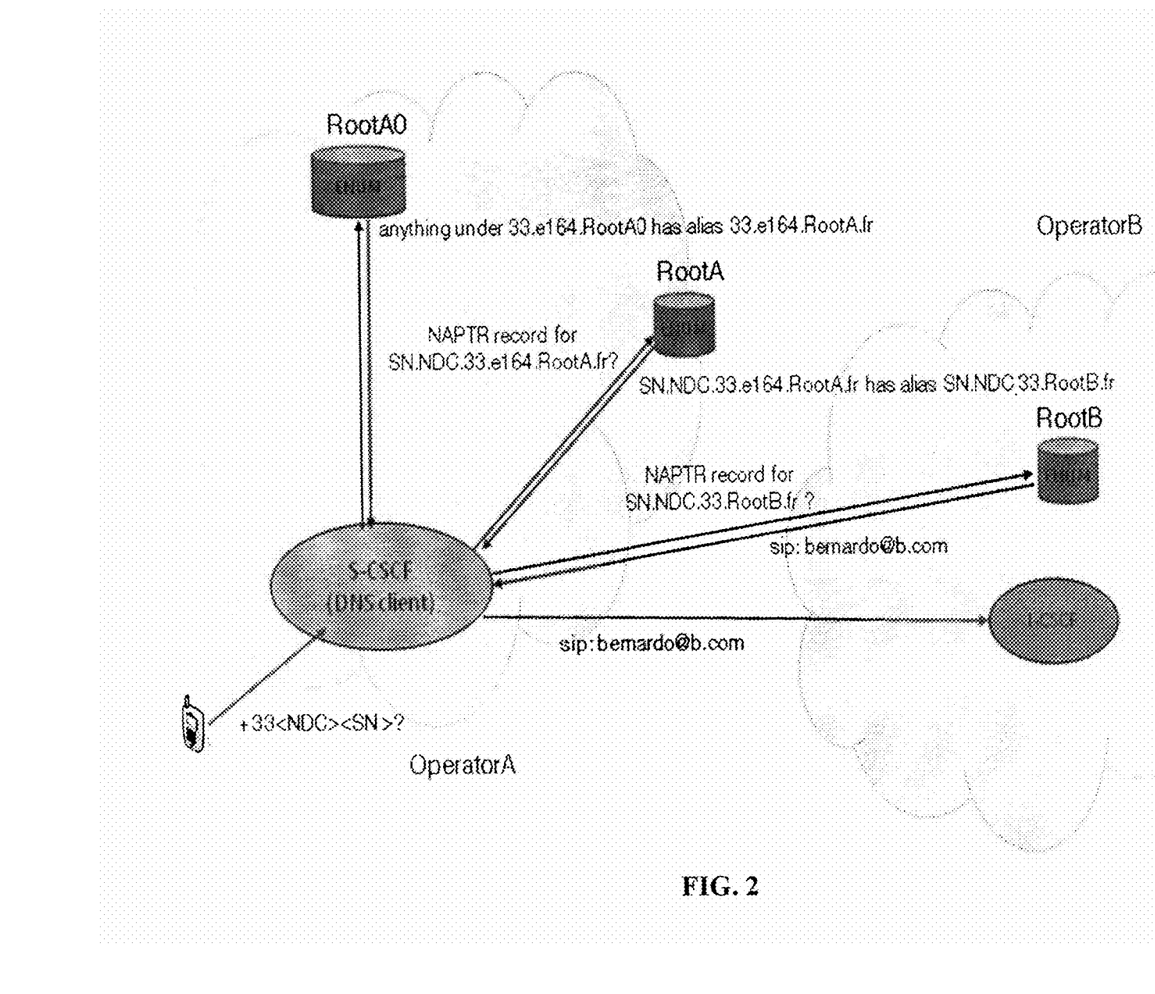
FIG. 2 is a diagram showing the successive steps of a method for resolving a ported telephone number in an implementation of the invention.

With reference to FIG. 2 which is a diagram showing an implementation of the present invention, there follows a description of the steps of a telephone calling method in which the called telephone number "+33123456789" is a ported number. By way of example, it is assumed that in this telephone number, the series of digits "+3312345" corresponds to a range of numbers allocated to operator A as a national destination code (NDC), and that the digits "6789" of the telephone number are associated specifically with Bernardo as the subscriber number (SN).

Since Bernardo has left the domain to which he belonged (which is not necessarily the originating domain A) while making use of the portability of the number, and since the operator of the originating domain A has been informed, during a step E'0 this operator created a corresponding record, described below with reference to FIG. 3b.

Steps E'1, E'2, and E'3 are then performed which are analogous respectively to above-described steps E1, E2, and E3. In this example, the "private" value of the "root" is "e164.RootA0".

Figure 3A:
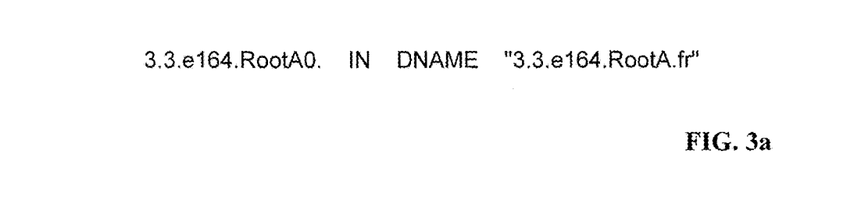
FIG. 3a shows a first record obtained when performing this implementation.
Figure 3B:
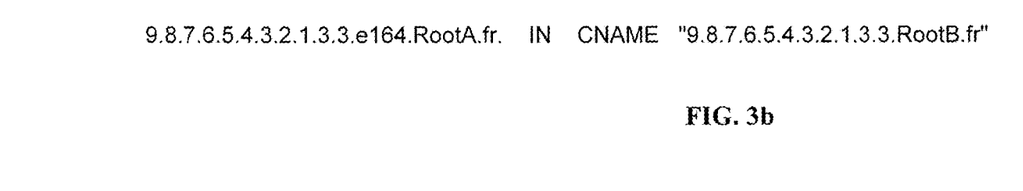
FIG. 3b shows a second record obtained when performing this implementation.

Thereafter, in a step E'4-a, the ENUM function of the root server searches in its database using the interrogation key "9.8.7.6.5.4.3.2.1.3.3.e164.Root.A0", and it finds the record of FIG. 3a.

FIG. 3a shows an example of a DNAME record for a French telephone number, having the effect that any DNS request relating to a domain name under 3.3.e164.RootA0 is redirected to a DNS server (or to an application emulating the functions of a DNS server)—which we call RootA—associated with the originating domain A and in charge of telephone numbers beginning with "+33". In other words, given the "DNAME" indication as the type of the RR, and by using the RDATA field of the RR, the ENUM function deduces that the search should be continued by using a referral domain, namely "3.3.e164.RootA.fr".

It is important to observe that consideration is given specifically to an ENUM database containing a record of the DNAME type, whereas conventional ENUM databases generally contain only records of the NAPTR type. Nevertheless, IETF RFC 5527 discloses a proposal relating to a particular situation for a DNAME type record in an ENUM database: assuming that VoIP operators set out to construct a single tree structure, referred to as I-ENUM ("infrastructure ENUM"), said DNAME type record would make it possible, while waiting for such construction to be completed, to redirect DNS requests relating to the domain "e164.arpa" to a DNS server forming part of that single tree structure; such a DNAME type record could then be associated with an iterative chain of CNAME type records.

During a step E'5-a, this information is sent to the call server (in this example the S-CSCF server) of the originating domain A, in response to the DNS request.

During a step E'4-b, the call server sends a new DNS request to the DNS server RootA using the interrogation key "9.8.7.6.5.4.3.2.1.3.3.e164.RootA.fr". This DNS server then finds in its ENUM database a record of the CNAME type, shown in FIG. 3b, containing in its RDATA field the expression "9.8.7.6.5.4.3.2.1.3.3.RootB.fr", giving the referral domain "RootB.fr" managed by an operator B.

It is important to observe that consideration is given specifically to an ENUM database containing a CNAME type record, whereas as mentioned above, conventional ENUM databases generally contain only records of the NAPTR type.

During a step E'5-b, this new information is sent to the call server (here the S-CSCF server) of the originating domain A.

Figure 3C:
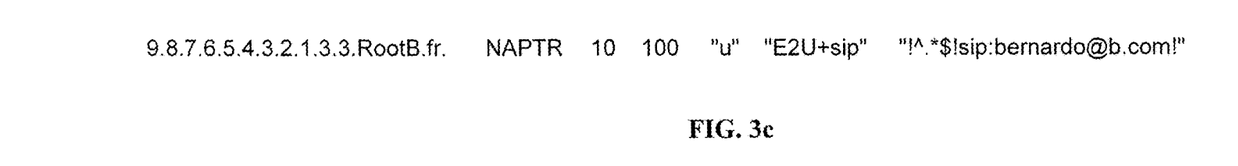
FIG. 3c shows a third record obtained when performing this implementation.

During a step E'4-c, the call server uses the interrogation key "9.8.7.6.5.4.3.2.1.3.3.RootB.fr", to search in the records of the DNS server of the operator B, where it finds the record shown in FIG. 3c. This record is of the NAPTR type and it provides a current SIP-URI for Bernardo, namely "sip:bernardo@b.com", in a manner analogous to above-described step E4.

It should be observed that in this implementation, the ENUM database of the DNS server RootA is an ENUM database of the invention since it contains a CNAME type record referring to the destination domain B. Since this server is associated with the originating domain A, this originating domain A in this example is a "penultimate domain" in the meaning of the invention.

During a step E'5-c, this URI is sent to the call server (here the S-CSCF server) of the originating domain A, in analogous manner to above-described step E5.

Finally, a step E'6 is performed that is analogous to the above-described step E6.

Thus, by means of the invention, Alice has been able, in a manner that is entirely transparent for her, to reach Bernardo even though Bernardo has changed domain with number portability. Furthermore, this result is obtained with means that are very simple to put into place for the operator of the originating domain.

In the above-described implementation, it is assumed that in the called number "+3312345689", the series of digits "+3312345" corresponds to a range of numbers allocated to the operator A, and that in step E'4-b the DNS server RootA of the originating domain A in charge of numbers beginning with "+33" is interrogated.

In a variant, it may be assumed that the range (e.g. "+3312345") has been delegated to a third network (e.g. "lambda.fr"), i.e. a network different from the networks of the originating domain A and the destination domain B. Under such circumstances, the step E'4-a of consulting the root server of the originating domain A finds a DNAME record referring to the third network, and in step E'4-b an ENUM database associated with this third network is interrogated using an appropriate interrogation key (e.g. "9.8.7.6.5.4.3.2.1.3.3.operator-lambda.fr"). Thus, even when, for telephone numbers belonging to ranges that have been allocated to a third network (e.g. when making an international call), it is not known which numbers have been ported, and where appropriate to which domains, this redirection and change of domain name make it possible advantageously to resolve a ported telephone number without needing to pay attention to the way in which the third network manages data (an ENUM type database or not, using the same root or not), and this in achieved in spite of a tree structure that is not shared. Where appropriate, the third network could be a "penultimate domain" in the meaning of the invention.

In the above description, consideration is given by way of example to a caller connected to an IMS network and consequently to an S-CSCF server as the call server issuing a DNS request. More generally, the invention naturally applies to any call server capable of issuing a DNS request, for example a border gateway or a gateway for interoperation with the PSTN, or indeed a service platform having routing functions.

The invention may be implemented within a node of a network or domain, in particular within a DNS server, by means of software and/or hardware components.

The software components may be incorporated in a conventional network node management program. That is why, as mentioned above, the present invention also applies to a computer system. In conventional manner, the computer system comprises a central processor unit using signals to control a memory, and also an input unit and an output unit. Furthermore, the computer system may be used to execute a computer program including instructions for performing any one of the methods of the invention for resolving a telephone number.

The invention also applies to a computer program that is downloadable from a communications network and that includes instructions for executing steps of a method of the invention for resolving a telephone number when it is executed on a computer. The computer program may be stored on a computer readable medium, and it may be executed by a microprocessor.

The program may use any programming language and be in the form of source code, object code, or code intermediate between source code and object code, such as in a partially complied form, or in any other desirable form.

The invention also provides a data medium that may be non-removable, or partially or totally removable, that is computer readable and that includes instructions of a computer program as mentioned above.

The data medium may be any entity or device capable of storing the program. For example, the medium may comprise storage means such as a read only memory (ROM), e.g. a compact disk (CD) ROM or a microelectronic circuit ROM, or indeed magnetic recording means such as a hard disk, or even a universal serial bus (USB) flash drive.

Furthermore, the data medium may be a transmissible medium such as an electrical or optical signal suitable for being conveyed via an electrical or optical cable, by radio, or by other means. The computer program of the invention may in particular be downloaded from an Internet type network.

In a variant, the data medium may be an integrated circuit in which the program is incorporated, the circuit being adapted to execute or to be used in the execution of any of the methods of the invention for resolving a telephone number.

Although the present disclosure has been described with reference to one or more examples, workers skilled in the art will recognize that changes may be made in form and detail without departing from the scope of the disclosure and/or the appended claims.

The invention claimed is:

1. A tElephony NUmbering Mapping (ENUM) database stored on a non-transitory computer-readable medium and comprising:
   at least one Canonical Name (CNAME) or Delegation Name (DNAME) record providing a referral domain in response to an interrogation key that is a function of a telephone number of a "called" user, wherein said called user belongs to said referral domain and said telephone number has been ported in relation to a change in the network/domain of the called user.

2. The ENUM database according to claim 1, wherein the database is associated with a fixed or mobile circuit-switched telephone network.

3. The ENUM database according to claim 1, wherein the database is dedicated entirely to ported telephone numbers.

4. A Domain Name System (DNS) server associated with the ENUM database according to claim 1.

5. A method enabling a network/domain, referred to as an "originating" domain to resolve a telephone number of a user referred to as a "called" user belonging to a network/domain referred to as a "destination domain", the method comprising:
   a) a "calling" user belonging to said originating domain sending a message using said telephone number of the called user as a routing identifier;
   b) a server of the originating domain in charge of routing said message, or a Domain Name System (DNS) server, generating an interrogation key as a function of the telephone number and of a domain name for a domain referred to as a "penultimate" domain;
   c) sending a DNS request to a DNS server associated with said penultimate domain;
   d) said DNS server associated with the penultimate domain using said interrogation key to search in a tElephony NUmbering Mapping (ENUM) database that is associated therewith;
   e) said search providing at least one Canonical Name (CNAME) or Delegation Name (DNAME) record containing a representation of a network/domain referred to as a "referral domain"; and
   f) sending a DNS request to said referral domain;
   wherein said referral domain comprises said destination domain, and prior to said message being sent, said telephone number has been ported in relation to a change of the network/domain of the called user.

6. A method according to claim 5, wherein said message is a telephone call and said server of the originating domain in charge of routing the message is a call server.

7. A method according to claim 5, wherein said penultimate domain is a third network distinct from said originating domain and said destination domain, and said telephone number belongs to a range of numbers that has been delegated to the operator of said third network for his own usage.

8. A method according to claim 5, wherein said originating domain is or is included in a network of Internet protocol type.

9. A non-transitory data storage medium comprising computer program code instructions stored thereon, which when executed by a processor perform a method enabling a network/domain, referred to as an "originating" domain to resolve a telephone number of a user referred to as a "called" user belonging to a network/domain referred to as a "destination domain", the method comprising:
   a) a "calling" user belonging to said originating domain sending a message using said telephone number of the called user as a routing identifier;
   b) a server of the originating domain in charge of routing said message, or a Domain Name System (DNS) server, generating an interrogation key as a function of the telephone number and of a domain name for a domain referred to as a "penultimate" domain;
   c) sending a DNS request to a DNS server associated with said penultimate domain;
   d) said DNS server associated with the penultimate domain using said interrogation key to search in tElephony NUmbering Mapping (ENUM) database that is associated therewith;
   e) said search providing at least one Canonical Name (CNAME) or Delegation Name (DNAME) record containing a representation of a network/domain referred to as a "referral domain"; and
   f) sending a DNS request to said referral domain;
   wherein said referral domain comprises said destination domain, and prior to said message being sent, said telephone number has been ported in relation to a change of the network/domain of the called user.

* * * * *